(12) United States Patent
Wong

(10) Patent No.: US 6,560,459 B1
(45) Date of Patent: May 6, 2003

(54) CDMA FREQUENCY PLANNING FOR FIXED WIRELESS APPLICATION

(75) Inventor: Tony W. Wong, Carrollton, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/216,674

(22) Filed: Dec. 18, 1998

(51) Int. Cl.[7] .................................................. H04Q 7/20
(52) U.S. Cl. ........................................ 455/447; 370/342
(58) Field of Search ................................. 370/310, 312, 370/315, 317–320, 331–335, 342–344, 432, 436, 437, 441, 478, 479, 482; 455/434, 440, 441, 444, 446, 447, 450–457, 526, 60, 62, 63, 65, 67.3, 464, 9, 10, 13.4, 500, 501, 504, 506, 509, 513

(56) References Cited

U.S. PATENT DOCUMENTS

| | | | | |
|---|---|---|---|---|
| 5,073,971 A | * | 12/1991 | Schaeffer | 455/447 |
| 5,475,864 A | * | 12/1995 | Hamabe | 455/447 |
| 5,483,667 A | * | 1/1996 | Faruque | 455/447 |
| 5,590,399 A | * | 12/1996 | Matsumoto et al. | 455/450 |
| 5,649,292 A | * | 7/1997 | Doner | 455/447 |
| 5,889,494 A | * | 3/1999 | Reudink et al. | 455/444 |
| 5,926,762 A | * | 7/1999 | Arpee et al. | 455/447 |
| 6,021,329 A | * | 2/2000 | Kornestedt et al. | 455/446 |
| 6,233,040 B1 | * | 5/2001 | Sekiguchi | 455/452 |
| 6,301,482 B1 | * | 10/2001 | Shohara | 455/67.3 |
| 6,311,068 B1 | * | 10/2001 | Leung et al. | 455/422 |
| 6,324,404 B1 | * | 11/2001 | Dennison et al. | 455/456 |
| 6,339,708 B1 | * | 1/2002 | Wang | 455/447 |
| 6,400,697 B1 | * | 6/2002 | Leung et al. | 455/446 |

* cited by examiner

Primary Examiner—Steven Nguyen
(74) Attorney, Agent, or Firm—John D. Crane; Bracewell & Patterson, L.L.P.

(57) ABSTRACT

The foregoing objects are achieved as is now described. A method for evaluating frequency plans for a CDMA based communication system having fixed base radio telephones is provided. The method begins by determining locations of a plurality of antennas. The plurality of antennas provide a coverage area for radio telephones. Then the method generates locations of radio telephones within the coverage area. Next, a distance from each radio telephone to the antennas is calculated. Then frequencies are allocated to the antennas. The resulting communication parameters between the radio telephones and the antennas are evaluated. Next, the coverage area which provides optimum power control to each radio telephone is determined. A frequency reuse factor is calculated to determine the efficiency of the allocated frequencies such that frequency allocation plans can be analyzed to determine efficient frequency planning.

7 Claims, 6 Drawing Sheets

| Deployment schemes | Antenna HBW (deg.) | Frequency Reuse Factor, φ |
|---|---|---|
| Omni-cell with different carrier | 360 | 0.650 |
| 3-sector with identical carrier | 60 | 0.605 |
| 6-sector with identical carrier | 33 | 0.562 |
| Proposed frequency plan for FWA | 33 | 0.855 |

Frequency reuse factor for different deployment schemes

Fig. 5

CDMA FREQUENCY PLANNING FOR FIXED WIRELESS APPLICATION

BACKGROUND OF THE INVENTION

1. Technical Field

The present invention relates in general to a radio telephone system and in particular to a method and system for allocating frequencies for fixed location radio telephones. Still more particularly, the present invention relates to a method and system for frequency planning for a communication system comprised of fixed wireless application.

2. Description of the Related Art

Evolving nations are implementing telephone based communication systems. It has been determined that the most economical method for installing a telephone system where no previous system exists is to designate a fixed base wireless telephone for each subscriber.

A Fixed Base Radio Telecommunication (FBRT) topology is commonly referred to as Fixed Wireless Application (FWA) or Wireless Local Loop (WLL). FWA and WLL allow a telephone company to take advantage of the wireless technology as a substitute for the last several miles of transmission line to bring telephony into a household and to users. The economic attractiveness of FBRT is enormous.

A telephone company will save the investment to lay down copper transmission lines in dense, and congested city streets and buildings. FWA and WLL also decreases the time to bring telephony service to demanding consumers.

FWA and WLL applications are novel because handoff requirements are greatly reduced because radio telephones remain within a fixed location (i.e. within a relatively small geographic area). In mobility application, handoff is an operational necessity to allow intra-cell roaming (sector-to-sector and within the same cell), and inter-cell roaming (roaming between cells).

Handoff is accomplished according to the technology utilized. For example, analog communication or digital communication require different handoff procedures. In digital technology, the type of communication is also important. Types of digital technology communication include Time Division Multiple Access (TDMA) and Code Division Multiple Access (CDMA). Digital technologies allow a higher number of subscribers to be simultaneously serviced. Hence, digital technology provides a communication system within a higher bandwidth.

A CDMA system utilizes soft handoff (SHO) to provide seamless, "make-before-break" transition for inter-cell roaming. SHO minimizes the forward and reverse link power requirement via antenna diversity.

In a FBRT system, users are stationary by definition. Except for users in the vicinity of a cell edge, most user profiles can be optimized to see a single dominant pilot signal and thus the percentage of SHO is greatly reduced. For users who are close to the cell edge or do not have adequate coverage, directional antennas can be prescribed to improve the communication link. In a FWA or a WLL, the requirements for SHO can be greatly minimized. However, due to fading and other phenomena SHO procedures cannot be entirely eliminated in a FBRT system.

In general, CDMA technology does not require a frequency plan as in Advanced Mobile Phone Service (AMPS), Time Division Multiple Access (TDMA), and Global System for Mobile communications (GSM) implementations. Each cell/sector utilizes the same carrier frequency and identifies itself via the PN (Pseudo-random Number) sequence offset. Thus, a mobile radio telephone only receives and transmits on an assigned PN sequence offset.

In a CDMA system, softer handoff is utilized for inter-sector roaming and soft handoff is utilized for inter-cell roaming. A CDMA is distinguished from conventional radio telephone technology. In conventional systems tele-traffic bearing capacity is limited by frequency (channel) allocation. Whereas tele-traffic bearing capacity in a CDMA system is limited by interference. Categorically, interference within a CDMA system can arise from many sources. A robust frequency plan requires analysis of interference possibilities.

In a CDMA cellular system, each base station not only receives interference from radio telephones in the home cell (intra-cell interference), but also from radio telephones in neighbor cells (inter-cell interference).

CDMA technology allows each cell to utilize the same frequency. Thus, when a mobile roams from cell to cell the mobile radio telephone is not required to change its transmit and receiver frequency.

Hence, interference arises in both the down-link (base stations to radio telephones) and up-link (radio telephones to base stations) directions. The impact to inter-cell and intra-cell interference are the most significant components of the overall interference constraints.

Another interference source is adjacent channel interference. The transition from AMPS to CDMA is emerging in the 800 MHz frequency band. CDMA cells overlay pseudo noise on existing AMPS cell site networks. Adjacent channels interference from AMPS channels and co-channel interference from AMPS channels from far away cells is possible. Generally, channel interference from far away cells is not significant and hence, is not considered. However, Adjacent Channel Interference (ACI) from microwave incumbents can cause significant interference.

The microwave incumbent interference can create a problem for CDMA systems in the 1900 MHz PCS frequency spectrum. Historically, the point-to-point microwave backhaul utilizes the 1900 MHz frequency band. However, the microwave incumbent is typically very localized and its impact is restricted to a very few selected number of cells/sectors.

The Federal Communication Commission (FCC) often requires microwave incumbents to relocate to other spectrum if radio telephone interference occurs. This trend is likely to continue in the future. In the 800 MHz spectrum microwave incumbents are not a significant problem.

Intermodulation interference both from same block (same operator) and different blocks (different operators) and thermal noise floor are also sources of undesirable interference. The effect of the third order intermodulation interference and thermal noise floor are considered to be independent of the number of sectors within a cell.

Thus, the impact of third order intermodulation interference and thermal noise floor are invariant to the configuration of sectorization. Hence, for a FWA or WLL sectorization method the impact of third order intermodulation interference and thermal noise floors is negligible.

Therefore, there is a need for a method for frequency planning for fixed wireless telephone applications. It would be also be desirable to provide a CDMA system frequency planning method which can increase the communication bandwidth, reduce the interference and increase the frequency reuse factor for a CDMA communication system.

SUMMARY OF THE INVENTION

It is therefore one object of the present invention to provide an improved radio telephone system.

It is another object of the present invention to provide a method and system for allocating frequencies for fixed location radio telephones.

It is yet another object of the present invention to provide a method and system for frequency planning a communication system comprised of fixed base radio telephones.

The foregoing objects are achieved as is now described. A method for evaluating frequency plans for a CDMA based communication system having fixed base radio telephones is provided. The method begins by determining locations of a plurality of antennas. The plurality of antennas provide a coverage area for radio telephones. Then the method generates locations of radio telephones within the coverage area. Next, a distance from each radio telephone to the antennas is calculated. Then frequencies are allocated to the antennas. The resulting communication parameters between the radio telephones and the antennas are evaluated. Next, the coverage area which provides increased power control to each radio telephone is determined. A frequency reuse factor is calculated to determine the efficiency of the allocated frequencies such that frequency allocation plans can be analyzed to determine efficient frequency planning.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts a frequency reuse table in accordance with one embodiment of the present invention.

DETAILED DESCRIPTION OF ILLUSTRATIVE EMBODIMENT

Figure 1:
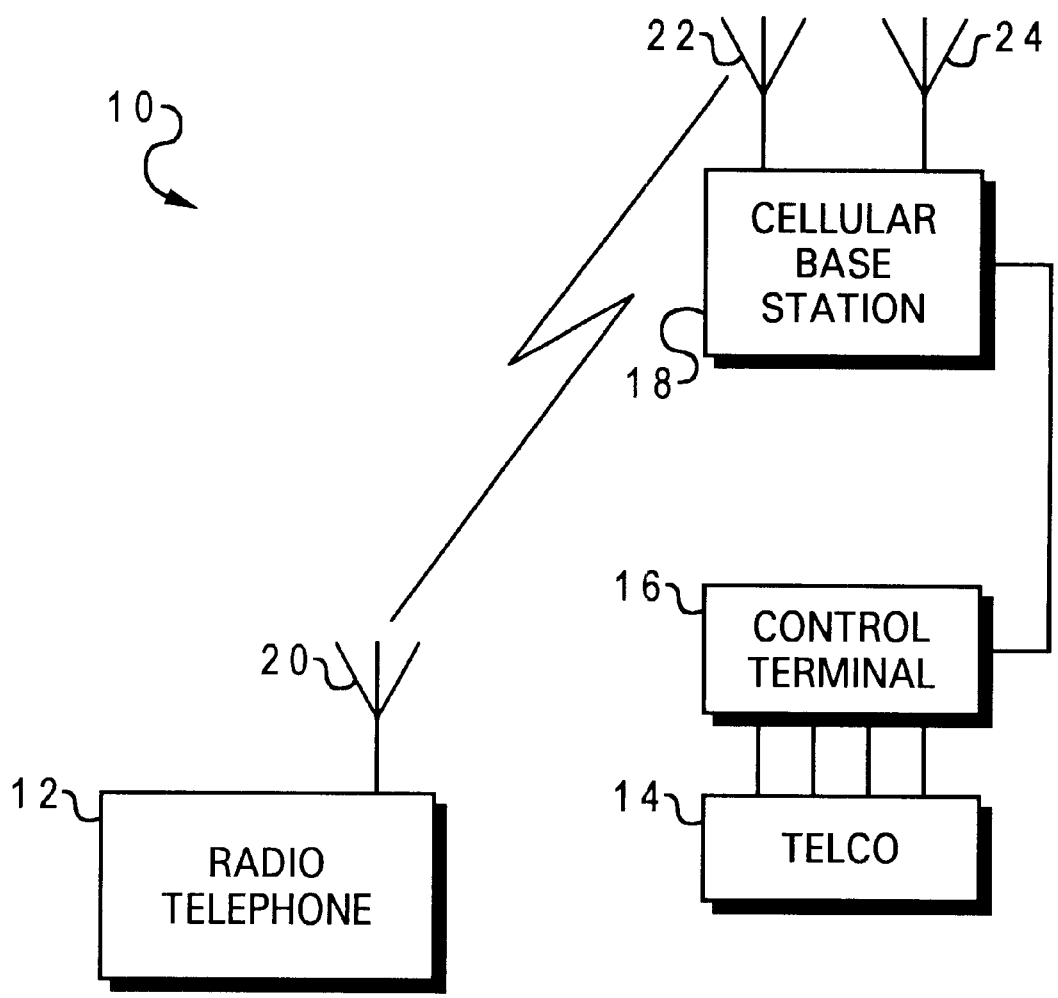
FIG. 1 illustrates a block diagram of a cellular telephone system in which a preferred embodiment of the present invention may be implemented.

With reference now to the figures and in particular with reference to FIG. 1, there is depicted a block diagram of a radio telephone system 10 in which a preferred embodiment of the present invention may be implemented.

Radio telephone system 10 depicted in FIG. 1 includes a telephone company phone system (TELCO) 14 or mobile switch center (MSC), connected by telephone landlines to a control terminal 16 which in turn is coupled, also by telephone landlines, to a cellular base station 18 that is located in a cell of a radio telephone system.

Those skilled in the art will appreciate that radio telephone system 10 is one type of a communication system which may be utilized in accordance with a preferred embodiment of the present invention. Radio telephone system 10 as described herein is one such embodiment and is presented for illustrative purposes only.

Radio telephone 12 communicates with cellular base station 18 via antennas 22 and 20. Antennas 22 and 20 can be implemented as telescopic whip antennas that extend or retract (i.e., lengthen or shorten), by being constructed in the form of overlapping concentric cylinders that slide inside of each other and make electrical contact with each other.

It will be appreciated by those skilled in the art that such antennas are, of course, only examples of antennas that can be utilized with a radio telephone system such as radio telephone system 10. A wide variety of other antenna can also be utilized in conjunction with a wireless communication system such as radio telephone system 10.

Additionally, the landlines utilized in association with radio telephone system 10 are lines that can be placed in areas on land or inland waterways, and can include twisted-pair lines, coaxial cables, and fiber optic cables utilized in overhead, direct buried, underground, microwave, and satellite applications.

Additional cellular base stations may be located throughout a geographic area to provide widespread telephone service to radio telephone 12. Cellular base station 18 incorporates both a receiver antenna 22 and a transmitter antenna 24 for communicating with radio telephone 12. Radio telephone 12 may be pocket-sized allowing an individual to easily transport the unit around in a house or inside of a property lot within a neighborhood.

In a preferred embodiment of the present invention the CDMA system ensures that radio telephone 12 remains operational in a designated area and becomes inoperative when radio telephone 12 roams from a designated area. Hence, the system is referred to as a Fixed Base Radio Telephone system. Allowing fixed base radio telephones to roam throughout a large geographic region would undermine the frequency planning method of the present invention causing inefficient channel utilization. The geographic area which a radio telephone can be utilized can be controlled by a variety of methods.

One method utilizes the time required by a radio signal to propagate from a radio telephone to a cell antenna. This time is commonly referred to by those having skill in the art as Round Trip Delay (RTD). RTD can provide a distance from a radio telephone to a cell antenna tower. When a radio telephone moves a specified distance from a specified cell antenna or a specified group of antenna service is terminated.

Another method for ensuring radio telephones do not undermine the plan of the present invention by roaming is only allowing an assigned sector and the sectors adjacent to the assigned sectors to communicate with radio telephone 12. Further, when a sector not assigned to, or not adjacent to the assigned sector establishes a strong link with radio telephone 12 service is terminated.

Radio telephone 12 includes antenna 20 for transmitting and receiving over cellular radio channels. In the United States, the cellular radio channels are in the frequency band from 824–894 MHz. More particularly, in the United States, a bandwidth of 50 MHz is allocated for cellular service. The 50 MHz bandwidth is distributed between 824 MHz and 849

MHz, and between 869 MHz and 894 MHz. Also, the Federal Communications Commission has allocated frequencies in the 1.9 GHz range for radio telephones. All of these radio frequency bands and other frequencies can be utilized in accordance with a preferred embodiment of the present invention.

Figure 2:
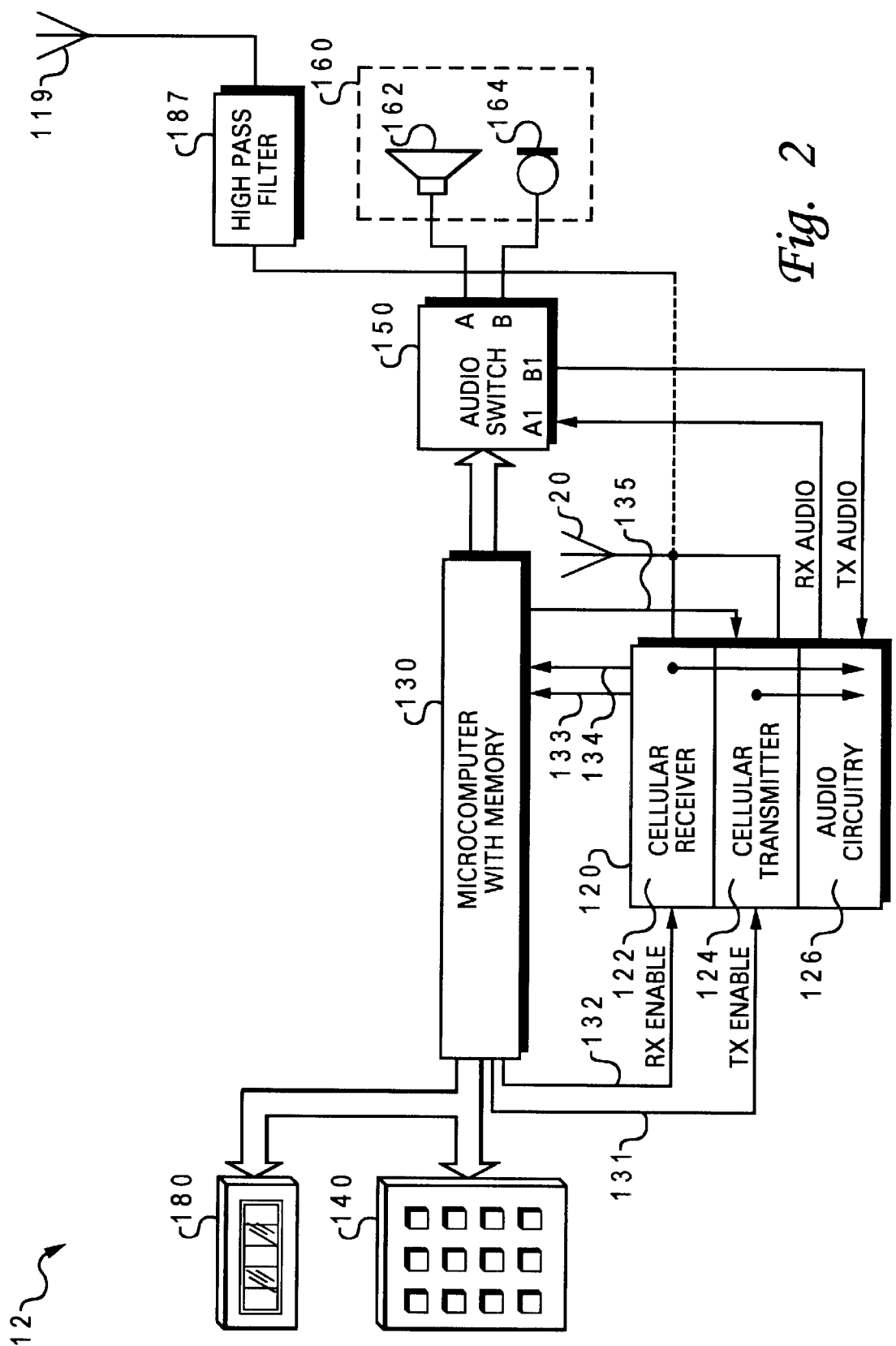
FIG. 2 depicts a block diagram illustrative of a mobile radio telephone which may be utilized in accordance with a preferred embodiment of the present invention.

FIG. 2 is a block diagram of a radio telephone 12 which may be implemented in accordance with a preferred embodiment of the present invention. Radio telephone 12 includes antenna 20, cellular telephone transceiver 120, microcomputer 130, keypad 140, display 180, audio switch 150, and audio interface 160, including speaker 162 and microphone 164.

Microcomputer 130 is a computer built around a single chip microprocessor. Less powerful than mini-computers and mainframe computers, microcomputer 130 is nevertheless capable of complex tasks involving the processing of logical operations. Microcomputer 130 includes a central processing unit (CPU) (i.e., not shown), which is the computational and control unit of microcomputer 130, and which interprets and executes instructions for radio telephone 12.

Alternatively, cellular telephone transceiver 120 may be coupled to a single antenna 119 in place of antenna 20 and by way of high-pass filter 187, respectively. High-pass filter 187 is utilized to filter only those signals which fall within a frequency range utilized by radio telephones.

High-pass filter 187 can be further modified to allow for radio telephone frequency ranges for utilization in a specific country. Specific design parameters of such a high-pass filter are left to the discretion of the manufacturer of a radio telephone such as radio telephone 12. Display 180 can be any type of display device which visually presents data to a radio telephone user.

Display devices such as a liquid crystal display or a plasma display, can be utilized to implement display 180. It is preferred that the display utilized in the present invention provides clear textual representations such that messages are clearly legible to a user.

Keypad 140 is a set of keys or depressible buttons that are mounted on a small keyboard and are dedicated to a specific purpose, such as receiving numerical input or feature selection. Keypad 140 is preferably modeled after the standard telephone keypad.

Control signals 131 TX ENABLE and 132 RX ENABLE of microcomputer 130 enable cellular transmitter 124 and cellular receiver 122, respectively. In addition to control signals 131 TX ENABLE and 132 RX ENABLE to cellular telephone transceiver 120, microcomputer 130 also monitors control signals 133 RSSI, 134 RX DATA, and 135 TX DATA for detecting signal strength, for detecting received data and for sending transmit data, respectively.

Control signals are utilized during the operation of cellular telephone transceiver 120. Audio circuitry 126 is coupled to audio switch 150 via control signals RX Audio and TX Audio. The architecture and control of the illustrated radio telephone is for illustrative purposes only and should not be utilized to limit the scope of the present invention.

Figure 3:
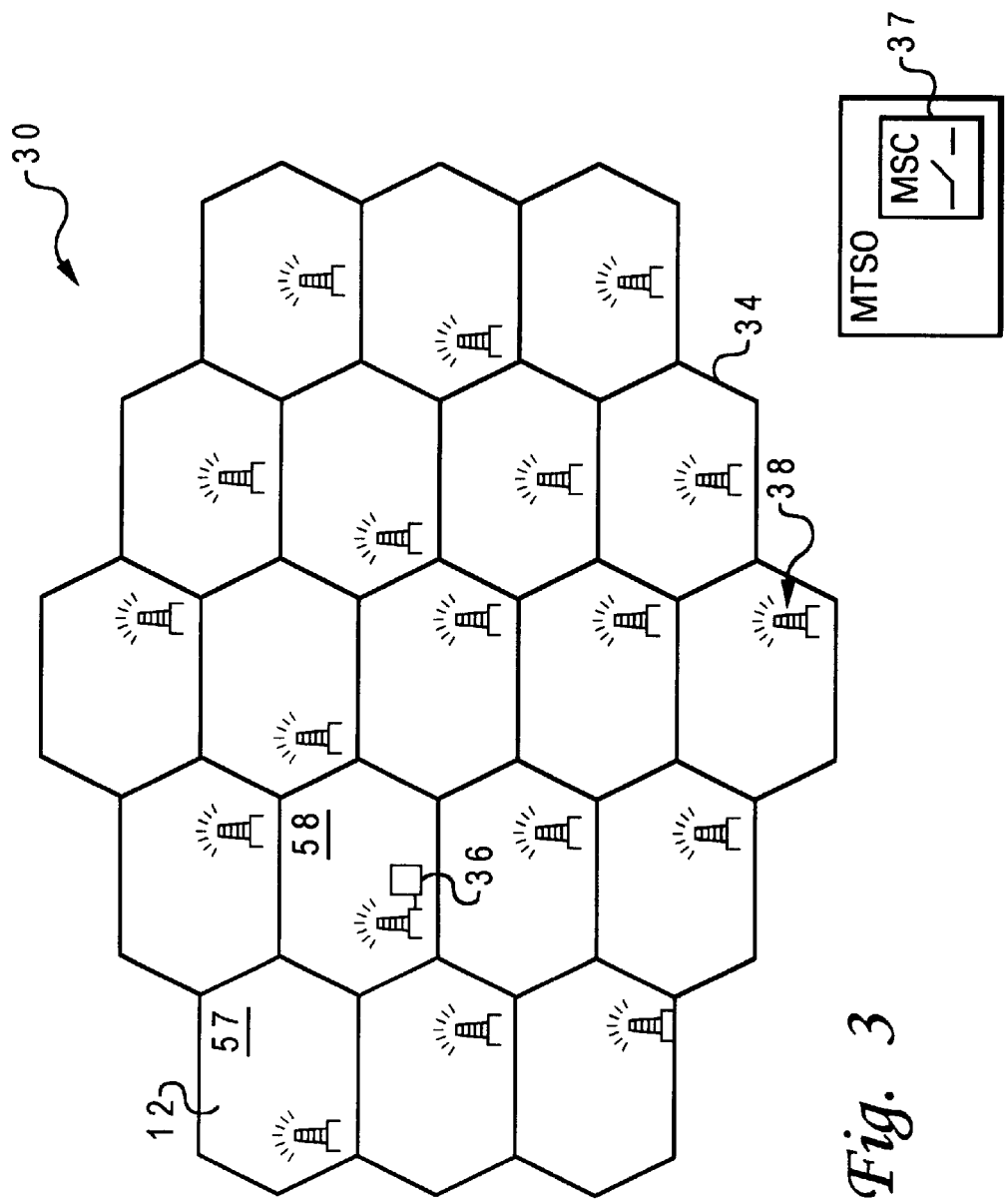
FIG. 3 illustrates a cellular telephone system in which a preferred embodiment of the present invention may be implemented.

FIG. 3 is a pictorial representation illustrative of a cellular telephone system 30 in which a preferred embodiment of the present invention can be implemented. Cellular telephone system 30 is analogous to radio telephone system 10 depicted in FIG. 1, and may incorporate utilization of communications devices such as radio telephone 12 depicted in FIG. 2.

Cellular telephone system 30 is composed of a variety of cells 34. Each cell encompasses a specified geographic area. Each geographic area has its own base station 38 and a single controller (not shown) interconnected with a public telephone network. Each cell 34 sits adjacent to another cell to create a honeycomb pattern of cells. Cells 34 can cover a large metropolitan area. Each cell 34 can have a radius of about 13 to 19 km (8 to 12 miles), depending upon the strength of each base station 38.

Specific cell radii are not necessary features of the present invention. Cells can have ranges as low as several hundred feet up to approximately 25 miles in radius. The specific numbers described herein are for demonstrative purposes only and are not necessary features of the present invention.

Although not illustrated in FIG. 3, each cell 34 can be further subdivided into still smaller cells. In this way, the honeycomb pattern of cells 34 can repeatedly utilize the same range of radio frequencies without interfering with one another.

In FIG. 3, each cell 34 can include a plurality of directional antennas centrally located in each cell 34. For example, a cell having 6 antennas is typically configured such that each antenna radiates into a sixty degree section of each cell. Eight and ten antenna cells are also a common implementation.

A plurality of cells 34 are combined to form cellular telephone system 30 covering a particular geographic area. This cellular system enables cellular telephone traffic to communicate with landline telephone networks and other cellular telephones.

Cellular telephone system 30 is an example of a cellular service, a communications service that allows a user to access the public telephone network from a dwelling without the requirement of physically placing a transmission line from a telephone substation to a residence. Cellular telephone system is based on a combination of radio transmission and telephone switching.

Individuals with small telephones can utilize this system in the same way that telephone calls are made utilizing standard carriers. The cellular service thus provides a communication link to the user by segmenting a large geographic area into smaller areas (i.e., cells).

Cellular telephone system 30 can include cellular subscriber units (i.e. active radio telephones) which are fixed to a relatively small geographic location. Each base station 38 is connected to the public telephone company (i.e., TELCO) via one or more cellular switching networks (not shown). Each cellular subscriber has an assigned cellular telephone number that allows the subscriber to place and receive calls within a widespread range of each base station 38.

Typically, base station 38 houses switching center (SC) 37. SC 37 switches calls from cell sites to wire line central offices such as (TELCO) 14 depicted in FIG. 1, or a public switched telephone network (PSTN), made up of local networks, exchange area networks, and long-haul networks that interconnect telephones and other communication devices on a worldwide basis.

SC 37 can control system operations in a CDMA network. For example, SC 37 can control calls and track billing information. SC 37 is a switch that provides services and coordination between cellular telephone users in a network such as cellular telephone system 30 and external networks.

Each radio telephone 12 is assigned to an individual cell or antenna depending on the location of radio telephone 12 with respect to the coverage area. Communication protocols between a mobile radio telephone and a base station controller are typically defined by an industry standard.

Channel capacity in a CDMA system is generally considered to be limited by interference considerations. Each radio telephone is power-controlled by an assigned sector often referred to as a "home" sector/cell to minimize the undesirable interference to the neighboring cells. Alternately stated, a mobile radio telephone transmits with less power when it is closer to the cell antenna, and the cell antenna transmits with less power to the radio telephone when the radio telephone is close proximity to the cell antenna. With transmit power control, neighboring cells can utilize identical frequency for data transmission because interference is greatly reduced.

However, controlling transmit power creates many problems. Often, the slow response and inaccuracy of power control due to signal transmission delay causes system failures. Signal transmission delay is due to the distance which a signal must travel to and from a radio telephone. Power control specifications are described in the IS-95 standard and will not be discussed in detail herein.

Figure 4:
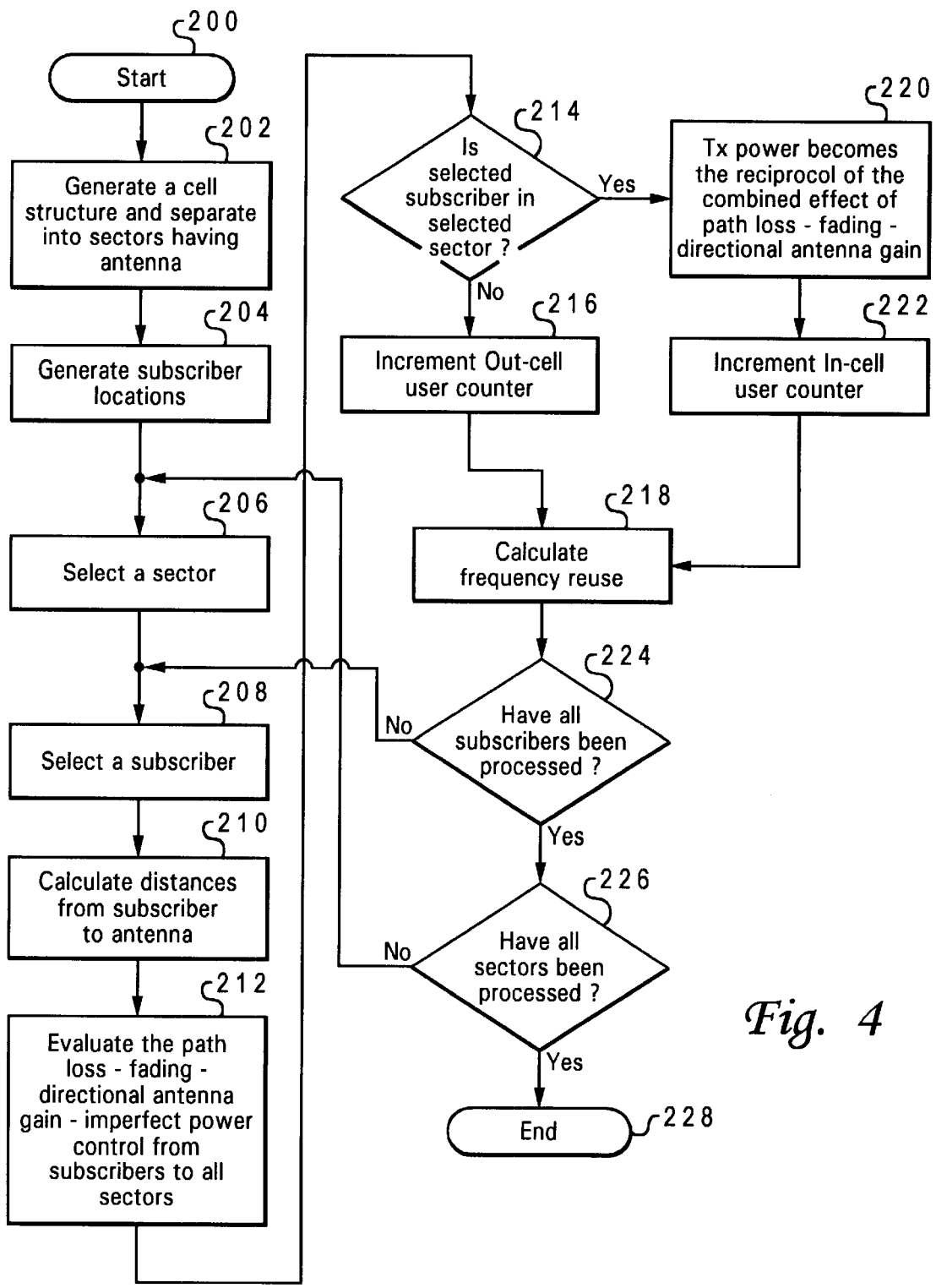
FIG. 4 depicts a high level flow diagram of a method for planning frequency allocations for a fixed base CDMA radio telephone system.

Referring now to FIG. 4, a high level flow diagram in accordance with the present invention is depicted. The process begins at block 200 and thereafter proceeds to block 202. As illustrated in block 202, a cell structure is generated and the cells are parsed into sectors. It is preferred to assume that cells provide coverage in a hexagonal cell pattern. However, hexagonal coverage is theoretical and actual coverage can vary substantially.

In the exemplary embodiment of the present invention, simulation for a 6-sector cell configuration is performed. A 6-sector cell implies 6 coverage sectors each servicing a 60° arc from the base of the cell antennas. A 6-sector cell typically has an array of 6 directional antennas residing at the top of a tower.

Figure 6:
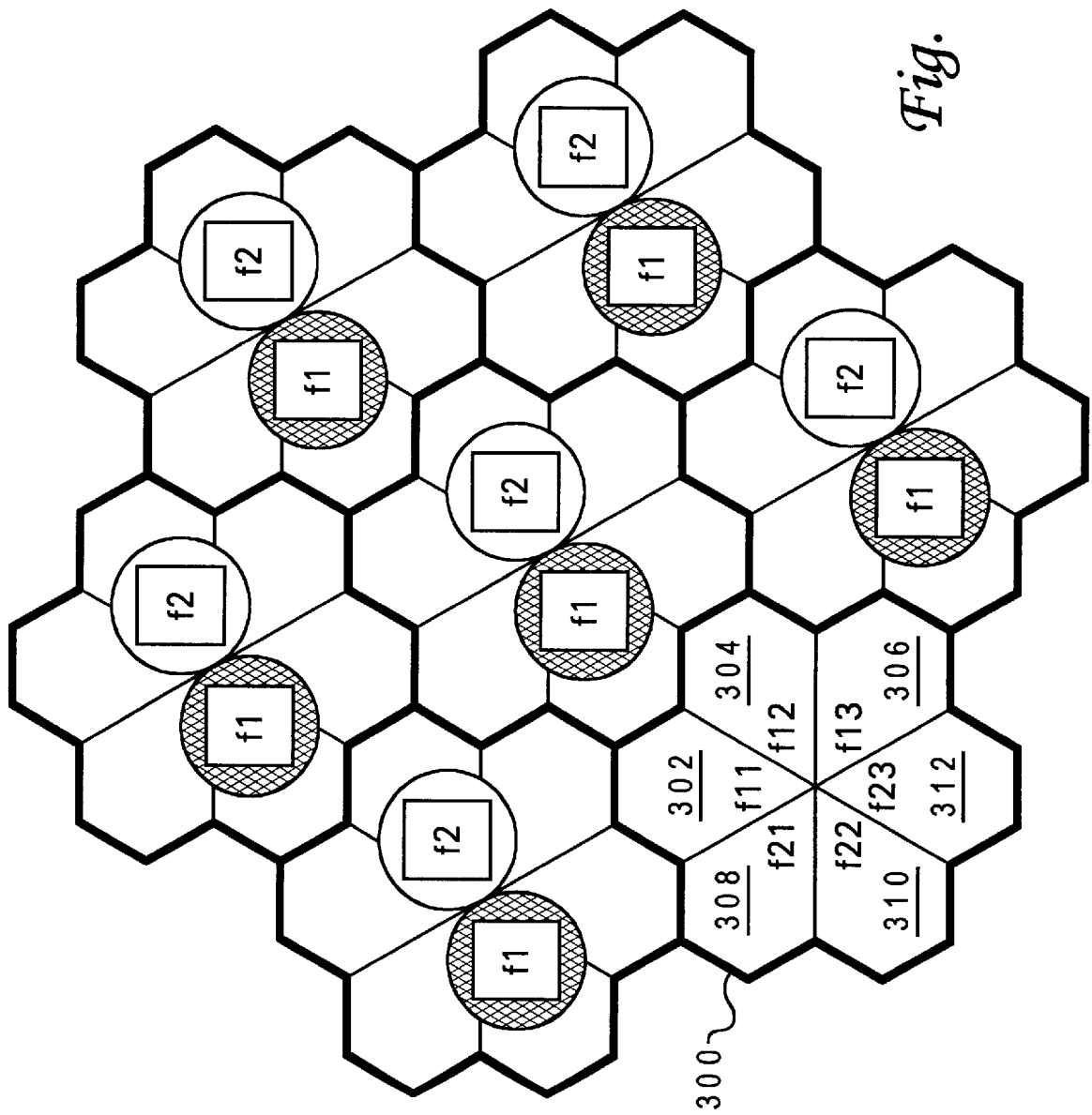
FIG. 6 illustrates the resulting frequency allocation in accordance with one embodiment of the present invention.

Referring briefly to FIG. 6, a quantity of 7, 6-sector cells residing adjacent to one another are illustrated. Cell 34 illustrates the 6 radiation patterns projecting from 6 cell antenna. Thus, cell 34 is separated into six sectors.

Referring back to FIG. 4 and illustrated in block 204, subscribers are generated and placed in random locations within the cell structure. A random number is utilized to arbitrarily define the location of fixed base radio telephones. A "Monte Carlo" simulation is utilized to simulate a "real life" scenario and ultimately determine a frequency reuse factor. Monte Carlo is a method well known in the art of probability and statistics for simulating elements of chance and will not be discussed herein.

In an actual system, locations within an urban environment are unpredictable. Additionally, fixed base radio telephones are also allowed to move within a cell to a limited extent. Any number of cells can be processed, however, the processing time required can become prohibitive with an excessive quantity of subscribers or cells.

In one exemplary embodiment, a large number of radio telephones, approximately 100,000 are placed in random locations in a 19-cell configuration and a three-tier architecture is simulated.

Next, as illustrated in block 206 the method selects a sector from the generated list of sectors to perform calculations upon. Then, as illustrated in block 208 a subscriber is selected from the generated list of subscribers. Then, the distance from each cell antenna to each subscriber or radio telephone is calculated in accordance with block 210.

As illustrated in block 212, operating parameters such as path loss, fading, antenna gain, and power control variations are calculated for the selected subscriber to all sectors.

In the method of the present invention, the propagation exponent is assumed to have a constant value of 4.0 for an entire network. Radio wave propagation attenuation is generally considered as the product of the βth power of distance r (i.e. distance from a radio telephone to cell antenna) and a log-normal component representing shadowing losses.

The propagation exponent varies in different physical environments. For example the propagation exponent varies within a single cell from 2.0 at very close to the cell antenna (line-of-sight), to as great as 5.5 far from the cell in very dense urban environment.

The shadowing loss $\xi$ in Decibels (dB) is a Gaussian random variable generally considered with standard deviation of $\delta=8$ dB. $\alpha$ is the antenna gain characterizing the air link between the mobile and the base station at the specific position. Fast fading due largely to multi-path is assumed not to affect the average power level. Hence, the aggregated path loss between a radio telephone and the base station is given by:

$$L_A = P_L + G_A + F_M \qquad \text{Equation 1}$$

Where $L_A$=Aggregated path loss $P_L$=Propagation loss $G_A$=Antenna gain $F_M$=Fading margin In a CDMA system, radio telephones in neighboring cells transmit at the same frequency. Interference is controlled by power controlling the radio transmissions within neighboring cells/sectors. Hence, if an interfering radio telephone is in an adjacent cell, at a distance $r_m$ from a radio telephones controlling home site, and it is $r_o$ from the home cell site of interest, when both radio telephones/base stations pairs are s active, the interfering radio telephone produces an interference to the home cell base station of interest represented by equation 2 below.

$$\frac{I(r_o, r_m)}{S} = \left[\frac{10^{(\xi_o/10)}\alpha_o}{r_o^\beta l_o}\right]\left[\frac{\beta r_m}{10^{(\xi_m/10)}\alpha_m}\right] = \qquad \text{Equation 2}$$

$$\left(\frac{r_m}{r_o^\beta}\right)\left(\frac{\alpha_o}{\alpha_m}\right)10^{(\xi_o-\xi_m)/10} \leq 1$$

The first term is the attenuation caused by the physical distance to the interfering cell, while the second term is the effect of power control to compensate for the corresponding attenuation to the cell site of the out-of-cell interferer. Generally, $\xi_m$ and $\xi_o$ are independent variable.

The result of the equation 2 is always less than unity. If the product of equation 2 becomes larger than unity, the radio telephone switches to the cell which makes equation 2 less than unity. This handoff phenomena ensures that attenuation is minimal. The cell to cell handoff procedures are described in ISO-95A.

In accordance with one embodiment of the present invention it is preferred in the calculation of inter-cell and intra-cell interference to extend equation one to simulate a 19 cell configuration including the actual antenna gain for each air link and the inaccuracy of the power control. The expected interference to the cell-site at the origin by the totality of uniformly distributed radio telephones in region $S_o$, surrounded by $N_C$ nearest cells, at origin is given in equation 3.

$$I_{\overline{S_o}} = E\left\{\left[\sum_{n=1}^{N_B N_M} \sum_{j=1}^{N_c-1} \frac{r_{n_o}^M \cdot 10^{(\xi_j/10)} \cdot \alpha_{n_j}}{r_{n_j}^M \cdot 10^{(\xi_o/10)} \cdot \alpha_{n_0}} \cdot 10^{X_j/10}\right]\right\};$$ Equation 3

$$\text{Min}_{i=1}^{N_c-1}\left\{\left(\frac{1}{r_{n_i}^M} \cdot 10^{(\xi_j+X_j)} = \frac{1}{r_{n_i}^M} \cdot 10^{(\xi_i+X_i)}\right) < \frac{1}{r_{n_o}^M} \cdot 10^{\xi_o+X_o}\right\},$$

for $n$ in $\overline{S_o}$ where, $N_B$ = number of cell sites considered;

$N_M$ = number of mobiles per cell, which is identical to each cell, assuming the mobiles are located randomly in the cell;

$N_C$ = number of handoff bases;

$r_{nj}^M$ = distance path loss of $n$th mobile to $j$th base, which is affected by antenna height;

$r_{no}^M$ = distance path loss of $n$th mobile to the reference base;

$\xi_j, \xi_o$ = values of shadowing for each of the $j$th and $O$th base, which has standard deviation of 8 dB respectively;

$\alpha_j, \alpha_o$ = antenna gain from mobile to the $j$th and $O$th bases respectively;

$X_j$ = the PCE (Power Control Error) for the $j$th base, caused from the mis-estimation of the received power. For a perfect power control condition, the value is zero.

Although a radio telephone in the present invention is allowed to move within a small boundary, in the present invention a radio telephone is considered to be a stationary unit. The present invention does not require soft handoff (SHO) for inter-cell roaming; however, SHO could be provided to accommodate high interference levels and fading problems.

Hence, the method of the present invention reduces cell interference of the reverse link of mobile radio telephones in neighboring cells exploring different sectorization schemes of the cell-site configuration and adjacent cells are not required to utilize identical frequency for deployment.

Radio telephone systems must be adaptable to growth. System expansion typically requires increased partitioning or sectorization of a cell. Shrinking cell sizes can also accommodate more subscribers. To reflect the logical growth path of the cellular network from lower sectorization to higher sectorization, in the method of the present invention the cell radii are normalized to unity.

In accordance with the present invention, it is preferred to make the following assumption. Imperfect power control is assigned a standard deviation of 1.5 dB. A path loss index of 4.0 is utilized to reflect a hybrid of dense urban and sub-urban environment.

A standard deviation of 8 dB is utilized to estimate fading margin. An omni-directional antenna is utilized for omni-cell deployment. Sixty (60) degrees antennas are utilized for tri-sector configuration, whereas thirty three (33) degrees antennas are utilized for 6-sector configuration.

An improvement which results from the method of the present invention can be illustrated by calculating a frequency reuse factor. The frequency reuse factor is defined as the ratio of in-cell interference to the total interference of the CDMA network.

In accordance with block 210, the individual path loss coupled with the un-correlated shadowing effect is calculated for all the sectors for the 19 cells. The azimuths of the radio telephones with respect to all the sectoral antennas are calculated. The angles are utilized to incorporate the antenna patterns in the horizontal plane to account for the variation of gain or signal attenuation.

The imperfect power of current systems is also considered. The summation of all four estimated variable (i.e. distance path loss, shadowing loss, antenna gain, and the imperfect power control) yields the aggregated attenuation for the air link from the radio telephone to each sector antenna.

The unique attribute of ignoring soft handoff considerations for a fixed base radio telephone in CDMA system is utilized to provide frequency planning.

Next as illustrated in block 214, and consistent with current CDMA standards, it is determined if the selected sector has the least aggregated attenuation with respect to the selected subscriber. If the selected subscriber has the least aggregated attenuation in the communication link to the selected sector/cell, then the subscriber is assigned to the sector/cell and the method proceeds to block 220.

For a selected cell, all aggregated attenuation for all air links and imperfect power control are compared to identify the appropriate home cell/sector for a fixed base radio telephone. The selected home cell/sector power-controls the transmit power of an assigned radio telephone. The exact transmitted power of the radio telephone is equivalent to the reciprocal of the aggregated attenuation of the air link to the radio telephone's home cell/sector.

The signal from the selected subscriber to its home cell/sector is interference to all the other cells/sectors in the network utilizing the same frequency and are not in the neighbor list. The selected sector is referred to as the subscriber's home sector/cell.

As illustrated in block 220, the transmit power of the selected subscriber becomes the reciprocal of the combined effect of path loss, fading and directional antenna gain. Then, as illustrated in block 222, the in cell user counter is incremented. The in-cell interference is accumulated and tabulated for the simulated deployment scenarios in FIG. 5.

If the selected subscriber is not within the selected sector/cell, then, as illustrated in block 216 the out of cell user counter is incremented. The out of cell interference are accumulated and tabulated for the simulated deployment scenarios. The frequency reuse factor can be determined by out of cell interference.

Next, as illustrated in block 218 total interference within a sector is calculated to reveal a frequency reuse factor.

It is generally accepted that the pole capacity of a CDMA system can be expressed by equation 4. Often, an 8K vocoder or EVRA (Enhanced Variable Rate Coder) are a preferred choice in FWA because they can provide higher capacity due to lower data rates. The processing gain can be calculated based on 8 K vocoder rate.

$$C_S = \frac{G_p}{(E_b/N_0)} \cdot \frac{1}{\upsilon} \cdot \varphi + 1$$ Equation 4 where:

-continued $C_s$ = sectoral pole capacity;

$G_p$ = processing gain = bandwidth/data rate.

= 1.2288 MHz/9.6 Kb/s = 128. – (or 21.1 dB)

$\varphi$ = frequency reuse factor

= $I_{\text{in-cell}}/(I_{\text{in-cell}}+I_{\text{out-cell}})$;

$v$ = voice activity factors. 40% of VAF is being utilized in the Markov call; (A Markov call is a standard testing configuration well known in the art)

$E_b/N_o$ = energy per bit to interference ratio;

It is also generally accepted that a loading factor of 50% is utilized to accommodate traffic considerations. Thus, a deployment configuration which possess a higher frequency reuse factor φ yields a higher air interface capacity.

In addition to problems created by propagation delay, a variety of factors cause uncontrollable interference. These factors include path loss distance, antenna gain (due to the antenna pattern), and fading conditions, further power control inaccuracy. Because a radio telephone is not always power-controlled by the closest cell site.

After the above calculations are performed the method determines if all subscribers have been processed as illustrated in block 224. If there are subscribers which remain to be processed, the method proceeds back to block 208. If no subscribers remain to be processed as illustrated in block 224, the method determines if there are any sectors which have not been processed as illustrated in block 226. If unprocessed sectors remain, the method returns to block 206. If no sectors remain to be processed, the method ends as illustrated in block 228.

Referring now to FIG. 5, results for the various deployment scenarios are provided in table form. The four developments schemes are calculated by the method of the present invention.

First column 400 provides the physical communication platform deployment. Four different physical implementations are provided and at the bottom of first column 400 are the results of the 19 six sector cell configuration exemplary of the method of the present invention.

Second column 402 tabulates the Horizontal Beam Width (HBW) of the antenna in all deployments. Third column 404 is the frequency reuse factor for the specific deployment. In the illustrated simulation, the frequency reuse factor for the frequency plan is 50% higher than the conventional 6-sector deployment. Specifically, the method of the present invention provides a frequency reuse factor of 0.855 as compared to a frequency reuse factor of 0.562 for a conventional six sector configuration.

This improvement is attributed to the better frequency isolation which reduces the interference level or noise floor in the proximity of radio telephone.

Referring now to FIG. 6, a sector and frequency allocation which yields improved frequency reuse is illustrated. As illustrated, cell 34 is divided into six sectors. Each of the six sectors $f_{11}$ 302, $f_{12}$ 304, $f_{13}$ 306, $f_{21}$ 308, $f_{22}$ 310 and $f_{23}$ 312 are assigned an arc of 60 degrees to provide 360 degree coverage within cell 34.

Sectors $f_{11}$ 302, $f_{12}$ 304, and $f_{13}$ 306 transmit utilizing a first frequency projecting into one-half of cell 34. Sectors $f_{21}$ 308, $f_{22}$ 310, and $f_{23}$ 312 transmit on a second frequency projecting into 180 degrees of cell 34. The depicted embodiment illustrates how identical frequencies which are present at the cell boundaries is minimized.

The analysis on the frequency plan in the present invention is based on the assumption that there is spectrum available. During the new deployment of a FWA system, the method of the present invention provides superior capacity. As urban areas develop, many systems get added and congested space results. Typically, the limited supply of frequency spectrum forces operators of radio telecommunication systems to re-configured the deployment of multi-carrier configurations.

As a consequence of the higher sectorization scheme, the present invention requires antennas with narrower beam width. In turn, an antenna with a narrower beam width provides higher gain and better link budget and; larger coverage radius. In FWA where coverage is the predominant factor, higher sectorization deployment remains attractive during the initial system design coverage.

While the invention has been particularly shown and described with reference to a preferred embodiment, it will be understood by those skilled in the art that various changes in form and detail may be made therein without departing from the spirit and scope of the invention.

What is claimed is:

1. A frequency allocation system for a cellular communication system comprising:

a plurality of cells residing substantially adjacent to each other, each cell having at least a first group of sectors and a second group of sectors, wherein said first group of sectors and said second group of sectors provide semicircular shaped coverage to radio telephones;

wherein a first frequency is utilized in said first group of sectors and a second, different frequency is utilized in said second group of sectors, wherein frequencies can be re-utilized by said plurality of cells with greater efficiency because interference between said adjacent cells is reduced;

wherein said semicircular shaped coverage provided by said first sector and said semicircular shaped coverage provided by said second sector combine to provide circular coverage around an antenna; and wherein said first group of sectors has a plurality of adjacent sectors located within adjacent cells and less than three of said adjacent sectors within adjacent cells utilize the same frequency that is utilized by said first group of sectors.

2. The frequency allocation architecture as in claim 1, wherein said semicircular coverage provided by said first sector and said semicircular coverage provided by said second sector are separated by a line of symmetry.

3. The frequency allocation architecture as in claim 1, wherein cells are divided into six sectors and said six sectors are divided into a first group of three adjacent sectors, and a second group of three adjacent sectors, wherein antennas which service said first group of three adjacent sectors transmit on a first frequency.

4. The frequency allocation architecture as in claim 3, wherein antennas which service said second group of three adjacent sectors transmit on a second frequency and said first frequency is different than said second frequency.

5. A frequency allocation architecture, for implementing a cellular communication system which utilizes CDMA technology to attain increased frequency reuse comprising:

a plurality of cells residing substantially adjacent to each other;

wherein each of said plurality of cells are divided into six sectors and said six sectors are divided into a first group of three adjacent sectors, and a second group of three adjacent sectors, wherein antennas which service said first group of three adjacent sectors transmit on a first frequency and antennas which service said second group of three adjacent sectors transmit on a second, different frequency;

wherein said first group of adjacent sectors and said second group of adjacent sectors each provide semi-circular shaped coverage that combine to provide circular coverage around an antenna to radio telephones;

wherein frequencies can be re-utilized by said plurality of cells with greater efficiency because interference between said adjacent cells is reduced; and wherein said first group has seven adjacent sectors which reside in adjacent cells and two of said seven adjacent sectors in adjacent cells utilize the same frequency utilized by said first group of sectors.

6. A frequency allocation architecture, for implementing a cellular communication system which utilizes CDMA technology to attain increased frequency reuse comprising:

a plurality of cells residing substantially adjacent to each other;

wherein each of said plurality of cells are divided into six sectors and said six sectors are divided into a first group of three adjacent sectors, and a second group of three adjacent sectors, wherein antennas which service said first group of three adjacent sectors transmit on a first frequency and antennas which service said second group of three adjacent sectors transmit on a second, different frequency;

wherein said first group of adjacent sectors and said second group of adjacent sectors each provide semi-circular shaped coverage that combine to provide circular coverage around an antenna to radio telephones;

wherein frequencies can be re-utilized by said plurality of cells with greater efficiency because interference between said adjacent cells is reduced; and wherein said first group of sectors has a plurality of adjacent sectors located within adjacent cells, wherein less than three of said adjacent sectors within adjacent cells utilize the same frequency that is utilized by said first group of sectors.

7. The frequency allocation architecture as in claim 4, wherein a first group of three adjacent sectors within a first cell has two adjacent sectors which reside in adjacent cells and which utilized the same frequency as said first group of sectors in said first cell.

* * * * *